Feb. 26, 1957 H. E. ROSE 2,783,453
ELECTRONIC CIRCUIT
Filed Jan. 31, 1956
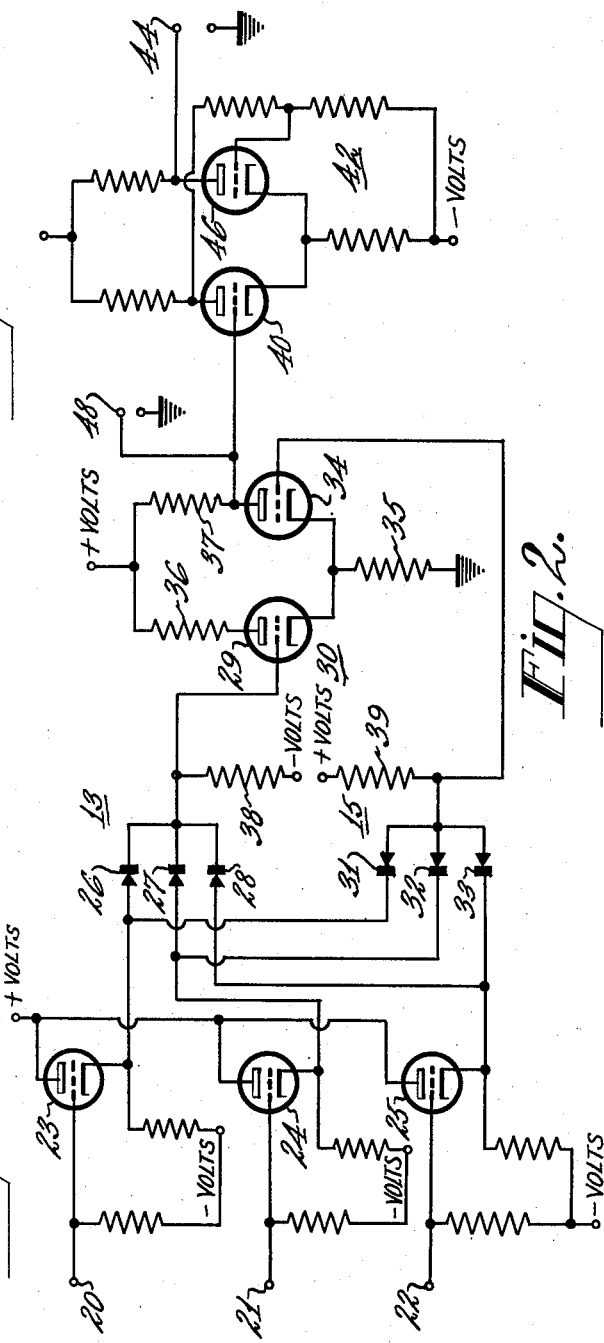
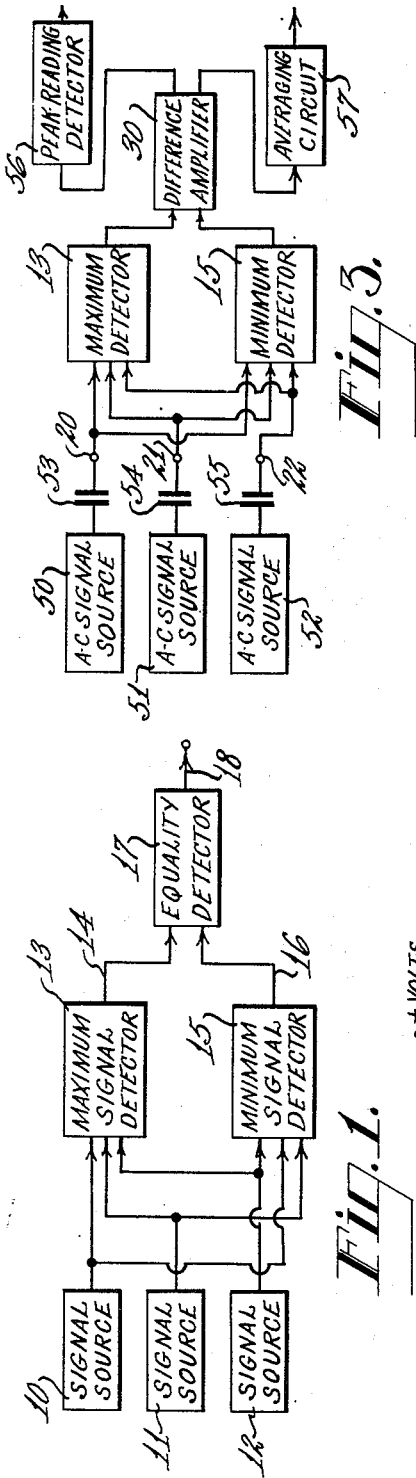
INVENTOR.
HARRY E. ROSE
BY
*Morris A. Rabkin*
ATTORNEY

United States Patent Office 2,783,453
Patented Feb. 26, 1957

2,783,453
ELECTRONIC CIRCUIT

Harry E. Rose, Haddonfield, N. J., assignor to Radio Corporation of America, a corporation of Delaware Application January 31, 1956, Serial No. 562,432

7 Claims. (Cl. 340—149)

This invention relates to electronic circuits for determining the range of or equality among three or more signals.

One application for such an equality detection circuit may be for determining relationships of three or more color signals that are respectively proportional to the different color components of an area of a colored subject. Equality of a set of such signals may indicate certain colorimetric relationships in the color area; the range of a particular set of such signals may supply additional colorimetric information of a color area. This invention is also of general application for determining equality and the range of a plurality of signals.

It is among the objects of this invention to provide:

A new and improved electronic circuit for determining the range of a plurality of signals;

A new and improved range determining circuit that is simple and reliable;

A new and improved circuit for detecting equality of three or more signals.

In accordance with this invention, a first means detects the maximum one of a plurality of input signals. A second means detects the minimum one of the plurality of signals. A third means detects equality of the maximum and minimum signals. When the maximum and minimum signals are equal, the input signals are equal.

The foregoing and other objects, the advantages and novel features of this invention, as well as the invention itself both as to its organization and mode of operation, may be best understood from the following description when read in connection with the accompanying drawing, in which like reference numerals refer to like parts, and in which:

Figure 1 is a block diagram of an equality detector embodying this invention;

Figure 2 is a schematic circuit diagram of an embodiment of this invention; and

Figure 3 is a block diagram of an embodiment of this invention for alternating current signals.

In Figure 1, a plurality of signal sources 10, 11, 12 are shown; three sources are shown by way of example. These sources may supply voltages of varying amplitudes representing quantities which have certain mathematical relationships that are to be determined, for example, by a computer. The signals from these sources 10, 11, 12 are applied to a maximum signal detector 13 which supplies on an output connection 14 a signal proportional to the maximum one of the signals it receives. The signals from the sources 10, 11, 12 are also applied to a minimum signal detector 15. This detector 15 produces on an output connection 16 a signal proportional to the minimum one of the signals that it receives. These maximum and minimum signals are applied to an equality detector 17 by way of connections 14 and 16. This equality detector 17 supplies to an output connection 18 a signal when the maximum and minimum signals are equal. There is only one condition for equality of the maximum and minimum signals, and that condition is equality of all of the signals from the sources 10, 11, and 12. Thus, a signal produced on the output connection 18 indicates equality of the signals supplied by the sources.

In Figure 2, a schematic diagram of the circuit is shown for performing the operations outlined in Figure 1. Three input terminals 20, 21, 22 receive input signals, which are in the form of voltages of varying amplitude. These input terminals 20, 21, 22 are respectively connected to the grids of separate cathode follower circuits 23, 24, 25. The cathodes of these cathode followers 23, 24, 25 are respectively connected to the anodes of three diodes 26, 27, 28. The cathodes of these diodes 26, 27, 28 are connected together and to the grid of the first tube 29 of a difference amplifier 30. The cathodes of the cathode followers 23, 24, 25 are also respectively connected to the cathodes of three diodes 31, 32, 33. The anodes of these diodes 31, 32, 33 are connected together and to the grid of a second tube 34 of the difference amplifier 30. Separate load resistors 38 and 39 are respectively connected between the grids of the tubes 29 and 34 and appropriate voltage levels.

The difference amplifier 30 is connected in a conventional manner with a common cathode resistor 35 and separate anode resistors 36 and 37. This circuit 30 is described in vol. 19 of Radiation Laboratory Series, "Vacuum Tube Amplifiers," McGraw-Hill, 1948, beginning at page 441. The difference output is taken at the anode of the tube 34 and applied to the grid of a tube 40 of a Schmitt trigger circuit 42. This circuit is described in the book "Time Bases" by Puckle, John Wiley & Sons, 1943, at page 57. An output terminal 44 is connected to the anode of the other tube 46 of the trigger circuit 42. An output terminal 48 may also be connected to the anode of the difference amplifier tube 34. This output is taken with respect to a reference voltage shown as the conventional ground symbol.

The input voltages received by terminals 20, 21, 22 are respectively applied to the anodes of the diodes 26, 27, and 28 by way of the associate cathode followers 23, 24, and 25, respectively. The range of input voltages is such that all of these diodes 26, 27, 28 tend to conduct, the diode having the maximum anode voltage tending to conduct the most. Assuming that the diode 26 has this maximum voltage, the cathode of this diode 26 tends to follow its anode voltage; the forward voltage drop of the diode may be considered to be negligible. Since the cathodes of these diodes 26, 27, 28 are connected together, all of the cathodes are at the same voltage. Therefore, the cathodes of the diodes 27 and 28 are at substantially the anode voltage of the diode 26 and, therefore, at a higher voltage than the anodes of these diodes 27, 28. Accordingly, the diodes 27 and 28 are held cut off, and the voltage applied to the grid of the tube 29 is the maximum one of the input voltages.

The input voltages received at the terminals 20, 21, 22 are applied, in a similar way, to the cathodes of the diodes 31, 32, and 33, respectively. Assuming the diode 33 receives the minimum one of the input voltages, the anode of that diode 33 will tend to follow the cathode voltage. Therefore, the anodes of all the diodes 31, 32, 33 will be at substantially the cathode voltage of the diode 33, and therefore, the diodes 31 and 32 are cut off. Thus, the voltage applied to the grid of the tube 34 is the minimum one of the input voltages. The difference amplifier 30 operates, in the usual manner, to produce at its anodes the difference between the grid voltages without regard to the voltage levels the grids are operating at. Thus, the voltage at the terminal 48 is the difference between the maximum and minimum voltages.

The maximum voltage is greater than or equal to the minimum voltage, and the grid-to-cathode voltage of the tube 34 is equal to the maximum subtracted from the minimum. Therefore, the largest conduction in the tube 34 occurs at equality of the maximum and minimum voltages, which is also the condition for the smallest voltage at the terminal 48. The trigger circuit 42 is arranged to be triggered at this smallest voltage. The tube 40 is triggered on when the inputs are not all equal. This inequality is indicated by cut off of the tube 46 and a positive-going step in voltage at the terminal 44. The tube 40 is triggered off when the inputs are all equal, which is indicated by a negative-going voltage step at the terminal 44. This step voltage may be used for any appropriate control operation that is to occur upon equality of the three voltages at the terminals 20, 21, and 22. A continuous measure of the range of the input voltages is provided by the amplitude of the difference voltage at the terminal 48.

The circuit shown in Figure 2 may be used for alternating input voltages as well as for direct input voltages. Where the input voltages are in phase and of the same frequency, the voltage at terminal 48 is a wave of the same frequency, the amplitudes of which are proportional to the instantaneous ranges of the input voltages.

Where the phase and frequencies of the input voltages are different, an arrangement such as is shown in Figure 3 may be appropriate. Parts previously described are referenced by the same numerals. Three A.-C. signal sources 50, 51, 52 are coupled by separate capacitors 53, 54, 55 to the input terminals 20, 21, 22. The maximum and minimum detectors 13 and 15 and the difference amplifier 30 are connected and operate in a manner similar to that described with respect to Figure 2.

The output of the difference amplifier 30 is applied to a peak reading detector 56, which may be, for example, a simple diode detector circuit such as is described in Terman, "Radio Engineering," 3rd ed., page 503. The output of the detector 56 is the envelope of the peaks of the difference waveform and, therefore, of the peaks of the instantaneous range. The difference waveform is also applied to an averaging circuit 57, which may be, for example, a simple integrating or filter circuit. The output of the averaging circuit 57 is the average of the difference waveform and, therefore, the average of the range of the A.-C. inputs. These peak and average signals may be applied to separate trigger circuits (not shown) in the manner described with respect to Figure 2.

By means of this invention, an electronic circuit is provided for determining the range of three or more input signals and for detecting equality of these signals. The circuit is simple and reliable.

What is claimed is:

1. An equality detection circuit comprising a plurality of at least three first means for individually and simultaneously receiving a plurality of at least three input signals, second means connected to all of said first means for producing at a first terminal a signal proportional to the maximum one of said simultaneously received input signals, third means connected to all of said first means for producing at a second terminal a signal proportional to the minimum one of said simultaneously received input signals, and fourth means connected to said first and second terminals of said second and third means for comparing said maximum and minimum proportional signals and for producing a signal to indicate equality of said maximum and minimum proportional signals.

2. An equality detection circuit comprising a plurality of electrical channels, first means for receiving separate input signals and for applying said signals to at least three of first ones of said channels, second means connected to said first means for rendering conductive to a second one of said channels the one of said first channels carrying the maximum one of said input signals, third means connected to said first means for rendering conductive to a third one of said channels the one of said first channels carrying the minimum one of said input signals, and fourth means connected between said second and third channels for producing signals in accordance with the state of equality of signals in said second and third channels.

3. An electronic circuit comprising a plurality of electrical channels, means for applying input signals to a plurality of first ones of said channel, means connected to said first channels and responsive to the signals therein for passing to a second one of said channels a signal proportional to the maximum of the signals in said first channels, means connected to said first channels and responsive to the signals therein for passing to a third one of said channels a signal proportional to the minimum of the signals in said first channels, and means connected to said second and third channels and responsive to said maximum and minimum proportional signals for producing a signal in accordance with the difference therebetween.

4. An electronic circuit comprising a plurality of electrical channels, first means for applying separate input voltages of varying amplitudes to at least three of first ones of said channels, second means connected to said first means for supplying to a second one of said channels the maximum one of the voltages in said channels, third means connected to said first means for supplying to a third one of said channels the minimum one of the voltages in said channels, and fourth means connected to said second and third channels for determining the difference between said maximum and minimum voltages.

5. An electronic circuit comprising at least three first unilateral impedances, at least three second unilateral impedances, each of said impedances having a first and a second terminal, at least three electrical channels respectively connected to different ones of the first terminals of said first impedances and respectively connected to different ones of the second terminals of said second impedances, means for supplying voltages of varying amplitude to said channels, means connecting said first impedance second terminals to be at the same voltage, means connecting said second impedance first terminals to be at the same voltage, and means connected to said first impedance second terminals and to said second impedance first terminals for determining the difference in voltage therebetween.

6. An electronic circuit comprising at least three first diodes, at least three second diodes, each of said diodes having a first and a second terminal, at least three electrical channels respectively connected to different ones of the first terminals of said first diodes and respectively connected to different ones of the second terminals of said second diodes, means for supplying voltages of varying amplitude to said channels, means connecting said second terminals of said first diodes to be at the same voltage, means connecting said first terminals of said second diodes to be at the same voltage, and means connected to said second terminals of said first diodes and to said first terminals of said second diodes for determining the difference in voltage therebetween.

7. An electronic circuit comprising a plurality of electrical channels, means for applying input signals to a plurality of first ones of said channel, means connected to said first channels and responsive to the signals therein for producing in a second one of said channels a signal proportional to the maximum one of the signals in said first channels, means connected to said first channels and responsive to the signals therein for producing in a third one of said channels a signal proportional to the minimum one of the signals in said first channels, and means connected to said second and third channels for comparing the relative magnitudes of said maximum and minimum proportional signals and for determining any difference therebetween.

References Cited in the file of this patent

UNITED STATES PATENTS

| | | |
|---|---|---|
| 2,688,740 | Merrill et al. | Sept. 7, 1954 |
| 2,700,759 | Ogle et al. | Jan. 25, 1955 |
| 2,735,082 | Goldberg et al. | Feb. 14, 1956 |